（12) United States Patent
Che et al.

(10) Patent No.: US 11,975,355 B2
(45) Date of Patent: May 7, 2024

(54) COATING SHIM AND COATING DEVICE

(71) Applicant: CONTEMPORARY AMPEREX TECHNOLOGY CO., LIMITED, Ningde (CN)

(72) Inventors: Huan Che, Ningde (CN); Wei Chen, Ningde (CN); Baohua Xu, Ningde (CN); Shisong Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/348,370

(22) Filed: Jul. 7, 2023

(65) Prior Publication Data

US 2023/0347373 A1 Nov. 2, 2023

Related U.S. Application Data

(63) Continuation of application No. PCT/CN2022/097946, filed on Jun. 9, 2022.

(30) Foreign Application Priority Data

Jul. 30, 2021 (CN) .......................... 202110873212.0

(51) Int. Cl.
 *B05C 5/02* (2006.01)
(52) U.S. Cl.
 CPC .................................. *B05C 5/0254* (2013.01)
(58) Field of Classification Search
 None
 See application file for complete search history.

(56) References Cited

U.S. PATENT DOCUMENTS

2012/0308755 A1* 12/2012 Gorman ................ B29C 48/305
                                                        264/45.9
2018/0345310 A1    12/2018 Watanabe et al.
(Continued)

FOREIGN PATENT DOCUMENTS

CN    204034968 U    12/2014
CN    108816565 A    11/2018
(Continued)

OTHER PUBLICATIONS

English translation of CN213133858.*
(Continued)

*Primary Examiner* — Charles Capozzi
(74) *Attorney, Agent, or Firm* — Kilpatrick Townsend & Stockton LLP

(57) ABSTRACT

A coating shim and a coating device, for applying a first slurry and a second slurry to an object to be coated are provided. The coating shim includes: a first flow channel for applying the first slurry to the object to be coated to form a first coating layer; and a second flow channel for applying the second slurry to the object to be coated to form a second coating layer. The first flow channel has a first slurry outlet at a first end face of the shim facing the object to be coated, the second flow channel has a second slurry outlet at the first end face, and the first slurry outlet and the second slurry outlet are configured to partially overlap in a thickness direction of the shim, such that the first coating layer and the second coating layer partially overlap in the thickness direction of the shim.

20 Claims, 6 Drawing Sheets

(56) References Cited

U.S. PATENT DOCUMENTS

| | | | |
|---|---|---|---|
| 2019/0054495 A1 | 2/2019 | Tsukamoto et al. | |
| 2019/0374971 A1* | 12/2019 | Horinouchi | B05D 1/34 |
| 2020/0136133 A1* | 4/2020 | Umehara | H01M 4/0409 |
| 2020/0147638 A1* | 5/2020 | Buck, Jr. | B05C 5/025 |

FOREIGN PATENT DOCUMENTS

| | | |
|---|---|---|
| CN | 208527155 U | 2/2019 |
| CN | 109482428 A | 3/2019 |
| CN | 209318048 U | 8/2019 |
| CN | 209406724 U | 9/2019 |
| CN | 209544514 U | 10/2019 |
| CN | 209631524 U | 11/2019 |
| CN | 213133858 U | 5/2021 |
| CN | 213612390 U | 7/2021 |
| JP | H078879 A | 1/1995 |
| JP | 2003151535 A | 5/2003 |
| JP | 2015026471 A | 2/2015 |
| JP | 2015069833 A | 4/2015 |
| JP | 2019076824 A | 5/2019 |
| JP | 6781967 B1 | 11/2020 |
| JP | 2021010867 A | 2/2021 |
| JP | 2021184983 A | 12/2021 |
| WO | 2019087668 A1 | 5/2019 |

OTHER PUBLICATIONS

Written Opinion of ISA for App. No. PCT/CN2022/097946 (PCT equivalent application).*
The international search report received in the corresponding international application PCT /CN2022/097946, dated Sep. 15, 2022.

* cited by examiner

US 11,975,355 B2

COATING SHIM AND COATING DEVICE

CROSS-REFERENCE TO RELATED APPLICATION

The present application is a continuation of International Application PCT/CN2022/097946, filed Jun. 9, 2022, which claims priority to Chinese Patent Application No. 202110873212.0, entitled "COATING SHIM AND COATING DEVICE" and filed on Jul. 30, 2021, which is incorporated herein by reference in its entirety.

TECHNICAL FIELD

The present application relates to the technical field of battery manufacturing, and in particular to a coating shim and a coating device.

BACKGROUND

In the battery production process, it is necessary to coat an active material layer and an insulating layer on an electrode sheet of the battery. After the coating of the electrode sheet of the battery is completed, it is necessary to determine a die-cutting position of a tab according to a boundary position of the active material layer and the insulating layer. When an existing coating device is used to jointly coat the active material layer and the insulating layer on the electrode sheet of the battery, the active material layer and the insulating layer are likely to be mixed during a drying process, resulting in an unclear boundary position, which leads to deviation in the determination of the die-cutting position of the tab, and reduces the dimensional accuracy of the electrode sheet.

SUMMARY OF THE INVENTION

The present application provides a coating shim and a coating device, so as to form a clear boundary when an active material layer and an insulating layer are jointly coated on an electrode sheet of a battery.

A first aspect of the present application provides a coating shim for applying a first slurry and a second slurry to an object to be coated. The coating shim includes: a first flow channel for applying the first slurry to the object to be coated to form a first coating layer; and a second flow channel for applying the second slurry to the object to be coated to form a second coating layer. The first flow channel has a first slurry outlet at a first end face of the shim facing the object to be coated, the second flow channel has a second slurry outlet at the first end face, and the first slurry outlet and the second slurry outlet are configured to partially overlap in a thickness direction of the shim, such that the first coating layer and the second coating layer partially overlap in the thickness direction of the shim.

The first slurry outlet and the second slurry outlet partially overlap in the thickness direction of the shim. When the object to be coated is being coated, the first coating layer partially covers the second coating layer, thereby reducing the problem of the unclear boundary between the first coating layer and the second coating layer at the adjacent position.

In some embodiments, the first slurry outlet is arranged spaced apart from the second slurry outlet.

With the spaced arrangement between the first slurry outlet and the second slurry outlet, when the object to be coated is being coated, the first slurry and the second slurry can be fully layered, thereby reducing the possibility of the first slurry and the second slurry penetrating into and mixing with each other during coating, so that a well-defined boundary is formed between the first coating layer and the second coating layer.

In some embodiments, the height of the second slurry outlet in the thickness direction is less than the thickness of the shim, so that the first slurry outlet can partially cover the second slurry outlet in the thickness direction of the shim, thereby ensuring that the first slurry outlet partially overlaps with the second slurry outlet in the thickness direction of the shim.

In some embodiments, the first slurry outlet and the second slurry outlet have an overlapping width of 0.1-9 mm in an arrangement direction of the first flow channel and the second flow channel.

The overlapping width is set such that the first slurry outlet is lap jointed to the second slurry outlet, to enable an edge of the first coating layer to cover an edge of the second coating layer.

In some embodiments, the second flow channel comprises an opening portion extending to the second slurry outlet, the opening portion having a width in the arrangement direction of the first flow channel and the second flow channel that gradually increases in a direction from a slurry inlet of the second flow channel to the second slurry outlet.

With the provision of the opening portion extending to the second slurry outlet, when the second slurry flows to the opening portion along the second flow channel, the width of the flow channel increases, but the flow rate of the second slurry remains unchanged, so that the depth of the second slurry in the opening portion in the thickness direction of the shim becomes smaller, thereby making the second coating layer applied to the object to be coated thinner.

In some embodiments, the first flow channel has a side surface in the arrangement direction of the first flow channel and the second flow channel that comprises a slope portion and a step portion connected to each other, the slope portion partially overlapping with the second slurry outlet in the thickness direction of the shim.

With the provision of the side surface of the first flow channel with a slope portion, the first slurry flowing out of the first flow channel through the slope portion is relatively thin, so that the coating thickness at the overlapping position of the first coating layer and the second coating layer will not be significantly increased to form a protrusion, and the overall thickness of the first coating layer thus remains uniform.

In some embodiments, the step portion has a height of 0.01-4.8 mm in the thickness direction of the shim.

The setting of the height of the step portion not only ensures that the slope portion partially overlaps with the second slurry outlet in the thickness direction of the shim, but also ensures the structural strength of the coating shim.

In some embodiments, the slope portion has a width in the arrangement direction of the first flow channel and the second flow channel that is not greater than 10 mm.

The setting of the width of the slope portion can not only ensure that the slope portion fully covers the second slurry outlet, but can also ensure the width of the part of the second slurry outlet that is not covered by the slope portion, thereby ensuring that the first coating layer partially covers the second coating layer, and ensuring the width of the exposed part of the second coating layer.

In some embodiments, the slope portion has a length of 1-50 mm in an outflow direction of the first slurry.

The length of the slope portion is set such that the slope portion covers, in a width direction, the edge of the second flow channel for a certain length, which can ensure that when flowing out, the first slurry covers the second slurry.

In some embodiments, the second flow channel comprises a groove portion for communicating the slurry inlet of the second flow channel and the second slurry outlet, and the slurry inlet penetrates the shim in the thickness direction of the shim.

The slurry inlet is configured to penetrate the coating shim, which can be applied to the situation where the second slurry flows into the coating shim from an upper die or a lower die of the coating device, thereby increasing the application range of the coating shim.

In some embodiments, the groove portion comprises an inlet section, an outlet section and a communication section; in the thickness direction of the shim, the inlet section and the outlet section are respectively located on two sides of the shim; and the inlet section is connected to the slurry inlet, the communication section is connected to the inlet section and the outlet section, and the outlet section is connected to the second slurry outlet.

According to the outlet of the second slurry of the upper die or the lower die of the coating device, the flow channel of the second flow channel is adaptively shaped such that the coating shim can adapt to different working conditions, thereby increasing the application range of the coating shim.

In some embodiments, the shim has a thickness of 0.2-5 mm, and the inlet section and the outlet section each have a depth of 5%-95% of the thickness of the shim.

The setting of the depth of the inlet section and the outlet section can make the second slurry flow out along the second flow channel, ensure the strength of the coating shim, and ensure that the first slurry outlet and the second slurry outlet of the coating shim partially overlap in the thickness direction of the shim.

A second aspect of the present application provides a coating device, including a lower die, an upper die, and the coating shim as described above, the coating shim being arranged between the upper die and the lower die.

In the coating shim and the coating device of the present application, the first slurry outlet of the first flow channel and the second slurry outlet of the second flow channel partially overlap in the thickness direction of the shim, so that the first coating layer and the second coating layer partially overlap in the thickness direction of the shim. The first coating layer partially covers the second coating layer, thereby reducing the problem of the unclear boundary between the first coating layer and the second coating layer at the adjacent position. When the object to be coated is an electrode sheet of the battery, during die-cutting of a tab for the electrode sheet, the die-cutting position of the tab is determined according to the clear boundary formed between the first coating layer and the second coating layer, improving the dimensional accuracy of the electrode sheet.

DESCRIPTION OF DRAWINGS

In order to more clearly illustrate the technical solutions of the embodiments of the present application, the drawings to be used in the embodiments of the present application will be described briefly below. Obviously, the drawings in the following description are merely particular embodiments of the present application. Those skilled in the art can obtain other drawings according to these drawings without any creative effort.

DESCRIPTION OF REFERENCE SIGNS

Figure 1:
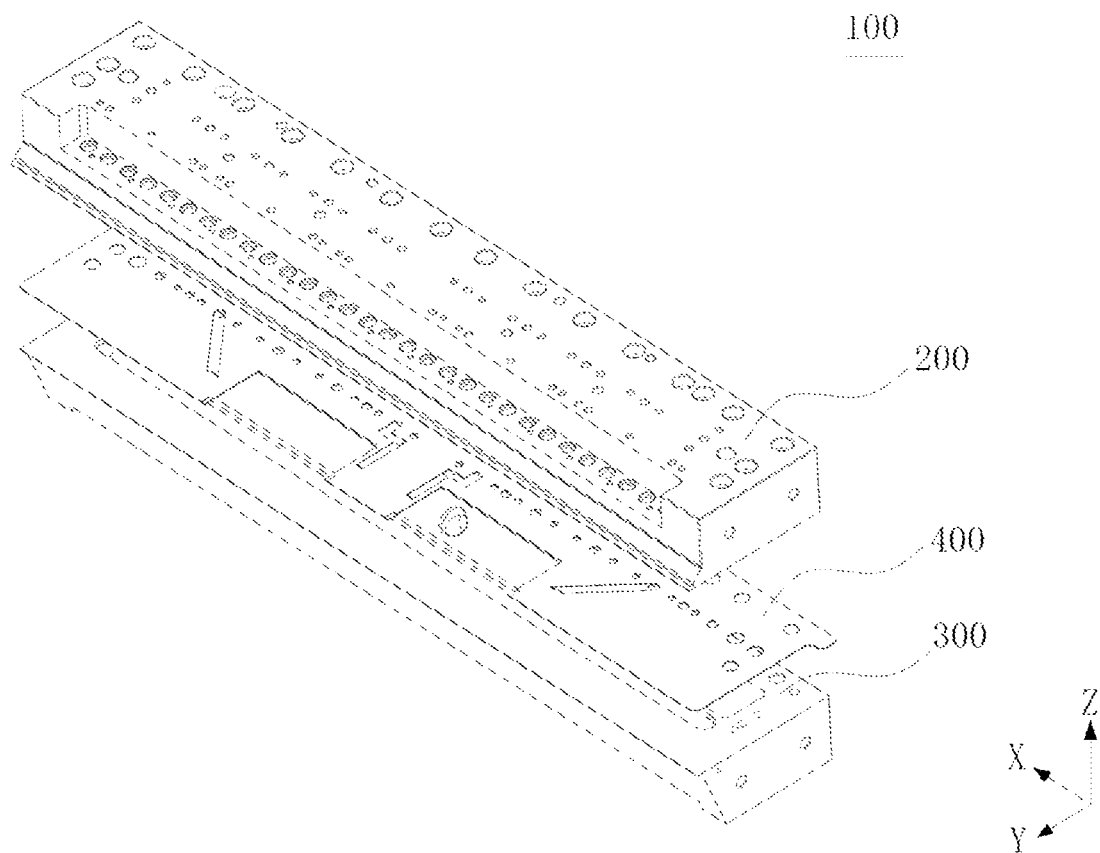
FIG. 1 is an exploded structural schematic view of a coating device according to an embodiment of the present application.

100. Coating device;
101. End face;
200. Upper die;
300. Lower die;
400. Coating shim;
401. First end face;
500. Object to be coated;
600. Drive roller;
1. First flow channel;
11. First slurry outlet;
12. Slope portion;
13. Step portion;
2. Second flow channel;
21. Second slurry outlet;
22. Opening portion;
23. Slurry inlet;
24. Groove portion;
241. Inlet section;
242. Outlet section;
243. Communication section;
3. Mounting hole;
X. Length direction of the coating shim (arrangement direction of the first flow channel and the second flow channel);
Y. Width direction of the coating shim (slurry outflow direction);
Z. Thickness direction of the shim;
h1. Distance between the first slurry outlet and the second slurry outlet in the thickness direction of the shim;
h2. Height of the second slurry outlet in the thickness direction of the shim;
h3. Thickness of the coating shim;
h4. Height of the step portion in the thickness direction of the shim;
w1. Distance between the first slurry outlet and the second slurry outlet in the length direction;
w2. Overlapping width of the first slurry outlet and the second slurry outlet in the length direction;
w3. Width of the slope portion in the length direction;
L. Length of the slope portion in the width direction;

The drawings herein, which are incorporated into and constitute a part of the specification, illustrate embodiments consistent with the present application and, together with the specification, are used to explain principles of the present application.

DETAILED DESCRIPTION

In order to better understand the technical solutions of the present application, embodiments of the present application are described in detail below with reference to the accompanying drawings.

It should be clear that the following embodiments are only some of the embodiments of the present application. All the other embodiments obtained by those skilled in the art based on the following embodiments without any creative effort shall fall within the scope of protection of the present application.

The terms used in the embodiments of the present application are merely for the purpose of describing specific embodiments, and are not intended to limit the present application. The terms "a/an", "said", and "the" in the singular form used in the embodiments of the present application and the appended claims are also intended to include the plural form unless otherwise clearly indicated in the context.

It should be understood that the term "and/or" used herein is only an association relationship for describing associated objects, indicating that three relationships may exist. For example, A and/or B may represent three situations: A exists alone, both A and B exist, and B exists alone. In addition, the character "/" herein generally indicates an "or" relationship between the associated objects.

It should be noted that the orientation terms such as "upper", "lower", "left" and "right" described in embodiments of the present application are described from the angle shown in the accompanying drawings, and should not be construed as limiting the embodiments of the present application. In addition, in the context, it also needs to be understood that when it is mentioned that an element is connected to an "upper" or "lower" portion of another element, it can not only be directly connected to the "upper" or "lower" portion of the another element, but also indirectly connected to the "upper" or "lower" portion of the another element via an intermediate element.

In the battery production process, it is necessary to coat an active material layer and an insulating layer on an electrode sheet of the battery. After the coating of the electrode sheet of the battery is completed, it is necessary to determine a die-cutting position of a tab according to a boundary position of the active material layer and the insulating layer.

The applicant has found that when an existing coating device is used to jointly coat the active material layer and the insulating layer on a current collector of the electrode sheet of the battery, the active material layer and the insulating layer are likely to be mixed during a drying process, resulting in an unclear boundary position, which leads to deviation in the determination of the die-cutting position of the tab, and reduces the dimensional accuracy of the electrode sheet of the battery.

Based on the above problems discovered by the applicant, the applicant improved the structure of the coating shim of the coating device, and embodiments of the present application will be further described below.

FIG. 1 is an exploded structural schematic view of a coating device 100 according to an embodiment of the present application.

As shown in FIG. 1, the coating device 100 provided by the present application includes an upper die 200, a lower die 300, and a coating shim 400 arranged between the upper die 200 and the lower die 300.

Figure 2:
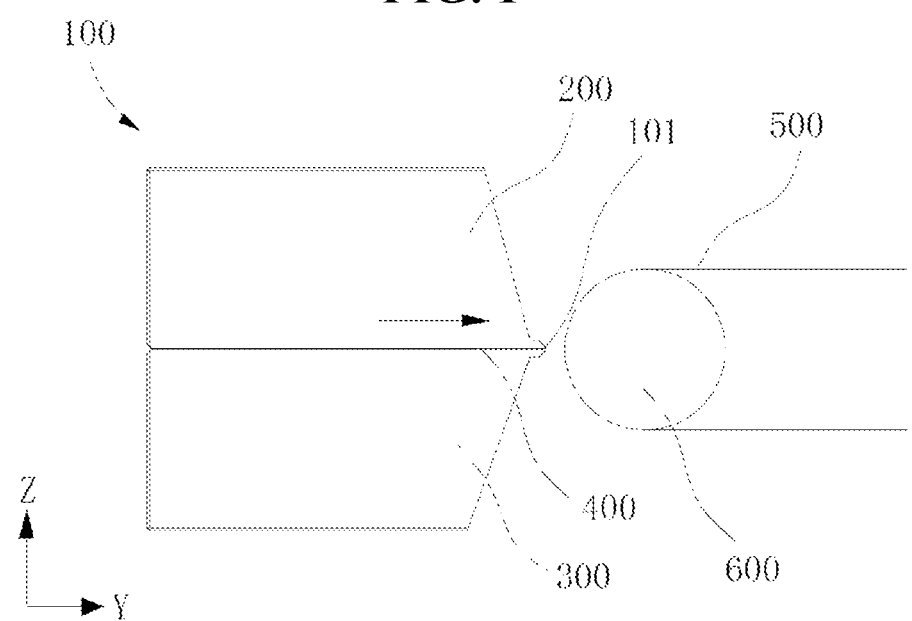
FIG. 2 is a schematic view of an object to be coated being coated by a coating device according to an embodiment of the present application.

FIG. 2 is a schematic view of an object 500 to be coated being coated by a coating device 100 according to an embodiment of the present application.

As shown in FIG. 2, when the coating device 100 performs a coating operation on the object 500 to be coated, an end face 101 of the coating device 100 perpendicular to a slurry outflow direction (the direction of the arrow in the figure) faces the object 500 to be coated, to perform a coating operation on the object 500 to be coated. The object 500 to be coated is transported on a drive roller 600, so that the object 500 to be coated is transported to the position of the end face 101 of the coating device 100, so as to realize continuous coating of the object 500 to be coated.

In the following embodiments, the slurry outflow direction is defined as a width direction Y of the coating shim 400, and the width direction Y mentioned herein is the slurry outflow direction.

In this embodiment, the coating device 100 can simultaneously apply two slurries to the object 500 to be coated, to form two different coatings. For example, a first slurry is delivered from the lower die 300 to the coating shim 400, and a second slurry is delivered from the upper die 200 or the lower die 300 to the coating shim 400. The first slurry and the second slurry flow out, through outlets respectively provided on the coating shim 400, to the end face 101 perpendicular to the width direction Y, and are applied to the object 500 to be coated.

The second slurry may be delivered from the upper die 200 to the coating shim 400, or from the lower die 300 to the coating shim 400, which can be set according to the actual usage and the structure of the coating shim 400.

In this embodiment, the object 500 to be coated is described in detail as a current collector of an electrode sheet of a battery. Of course, the present application is not limited to the coating of the current collector of the electrode sheet of the battery. The object 500 to be coated may be any carrier that needs to be coated with a coating. The first slurry may be an active material, which is applied to the current collector to form an active material layer; and the second slurry may be an insulating material, which is applied to the current collector to form an insulating layer.

The current collector is a continuous foil, which is transported on the drive roller 600. When the current collector is conveyed to the end face 101 of the coating device 100, a slurry flows out of a slurry outlet of the coating device 100 that is provided on the end face 101, and is applied to the current collector, such that a continuous coating layer is formed on the current collector. After the coating is completed, the current collector coated with the coating layer is die-cut according to the size of the electrode sheet of the battery, to obtain an electrode sheet of the battery of a predetermined size.

Figure 3:
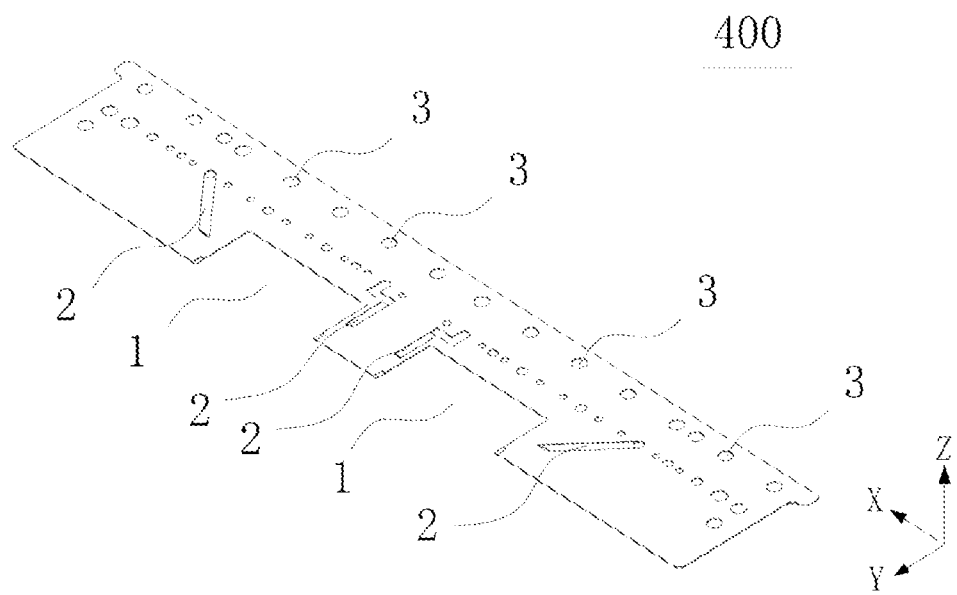
FIG. 3 is a perspective structural schematic view of a coating shim according to an embodiment of the present application.

FIG. 3 is a perspective structural schematic view of a coating shim 400 according to an embodiment of the present application.

As shown in FIG. 3, a coating shim 400 according to an embodiment of the present application is used for applying a first slurry and a second slurry to an object 500 to be coated. The coating shim 400 includes a first flow channel 1 and a second flow channel 2. The first flow channel 1 is used for applying the first slurry to the object 500 to be coated, to form a first coating layer, and the second flow channel 2 is used for applying the second slurry to the object 500 to be coated, to form a second coating layer. A plurality of mounting holes 3 are further provided in the coating shim 400 for fixed connection with the upper die 200 and the lower die 300.

Second flow channels 2 are respectively arranged on two sides of the first flow channel 1 of the coating shim 400 in FIG. 3. The respective arrangement of the second flow channels 2 on the two sides of the first flow channel 1 enables second coating layers to be coated to both sides of the first coating layer when the current collector is being coated. After the coating is completed, the current collector is die-cut in the middle of the first coating layer, so that two electrode sheets of the battery can be formed, each electrode sheet of the battery is coated with the first coating layer, and the edge of the first coating layer is coated with the second coating layer.

Moreover, as shown in FIG. 3, two first flow channels 1 are arranged side-by-side on the coating shim 400 in an arrangement direction of the first flow channels 1 and the second flow channels 2. In this way, it is possible to realize the coating of multiple electrode sheets of the battery for one current collector through one coating operation, improves the coating efficiency.

Similarly, it is also possible that, according to the sizes of the current collector and the electrode sheet of the battery, a plurality of first flow channels 1 are arranged side-by-side on the coating shim 400, and second flow channels 2 are respectively arranged on two sides of each first flow channel 1, so that multiple electrode sheets of the battery are coated through one coating operation.

In the following embodiments, the arrangement direction of the first flow channel 1 and the second flow channel 2 is defined as a length direction X of the coating shim 400, and the length direction X mentioned herein is the arrangement direction of the first flow channel 1 and the second flow channel 2.

Figure 4:
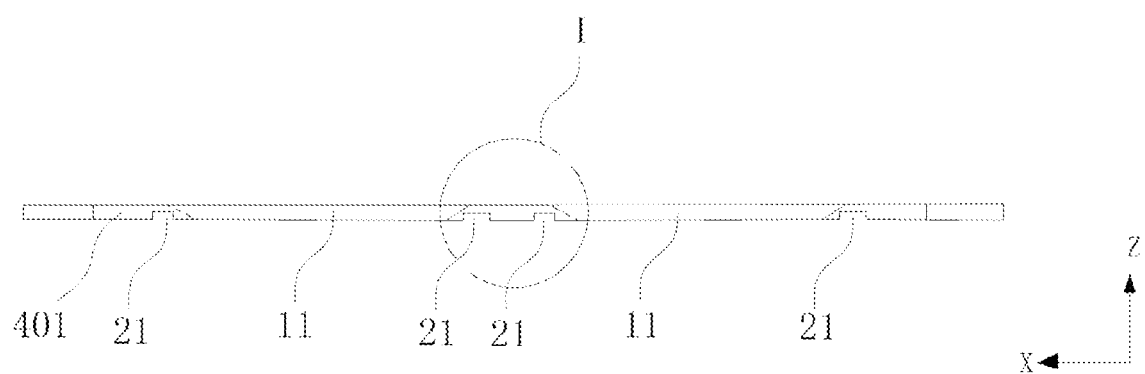
FIG. 4 is a front view of a coating shim according to an embodiment of the present application.

FIG. 4 is a front view of a coating shim 400 according to an embodiment of the present application.

As shown in FIG. 4, the coating shim 400 has a first end face 401 on the side facing the object 500 to be coated. The first end face 401 is perpendicular to the width direction Y. The first flow channel 1 has a first slurry outlet 11 at the first end face 401, the second flow channel 2 has a second slurry outlet 21 at the first end face 401, and the first slurry outlet 11 and the second slurry outlet 21 are configured to have projections in a thickness direction Z of the shim partially overlapping, so that projections of the first coating layer and the second coating layer partially overlap in the thickness direction Z of the shim.

As shown in FIG. 4, the first slurry outlet 11 is partially located above the second slurry outlet 21. When the object 500 to be coated is being coated, the first slurry flows out from the first slurry outlet 11, and the second slurry flows out from the second slurry outlet 21, such that the first slurry partially covers the second slurry, and the first slurry and the second slurry respectively form the first coating layer and the second coating layer applied to the foil of the current collector of the electrode sheet of the battery. The first coating layer partially covers the second coating layer, and during the drying process, the second slurry is prevented from penetrating towards the first slurry to an upper surface of the first coating layer, thereby avoiding the problem of the unclear boundary between the first coating layer and the second coating layer at the adjacent position.

Figure 5:
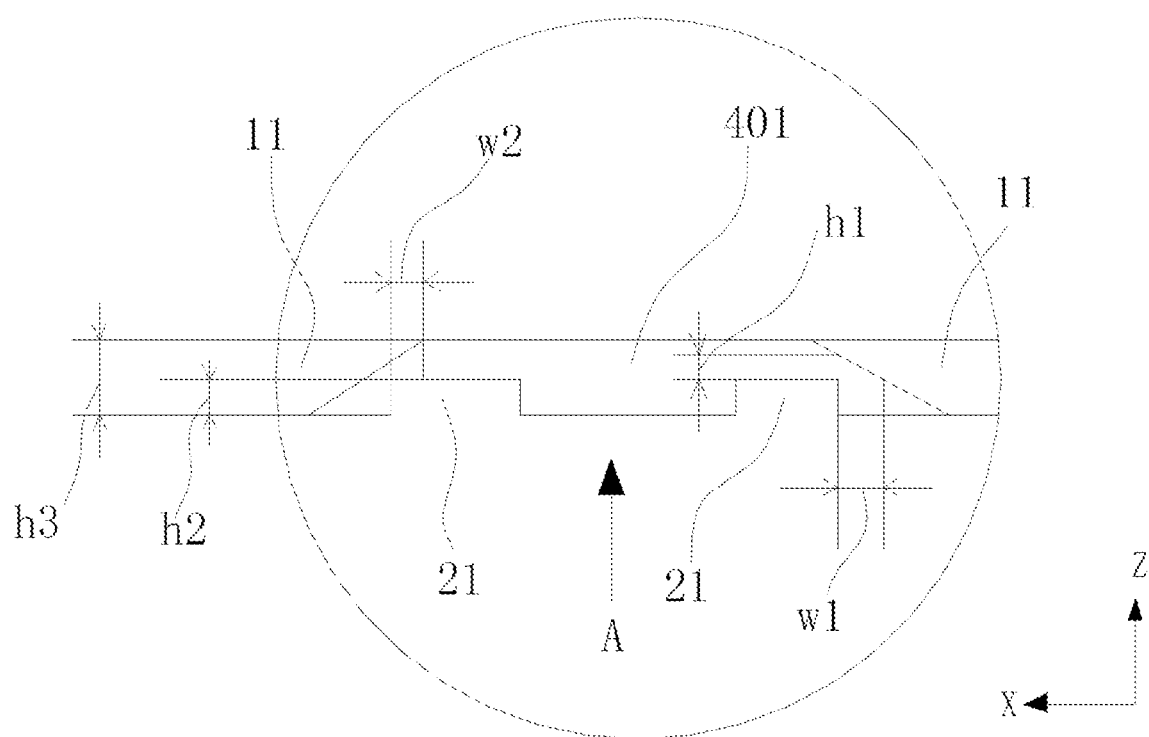
FIG. 5 is an enlarged view of part I of FIG. 4.

FIG. 5 is an enlarged view of part I of FIG. 4.

As shown in FIG. 5, the projections of the first slurry outlet 11 and the second slurry outlet 21 partially overlap in the thickness direction Z of the shim, but the first slurry outlet 11 is not in communication with the second slurry outlet 21. A distance h1 is reserved in the thickness direction Z of the shim, and a distance w1 is reserved in the length direction X, so that the first slurry outlet 11 is arranged spaced apart from the second slurry outlet 21.

In some embodiments, the first flow channel 1 is arranged spaced apart from the second flow channel 2 to reduce the possibility of mixing between the first slurry and the second slurry due to contact.

As shown in FIG. 5, the second slurry outlet 21 has a height h2 of in the thickness direction Z of the shim that is less than a thickness h3 of the coating shim 400, and the first slurry outlet 11 has a height equal to the thickness h3 of the coating shim 400. That is, the first slurry outlet 11 is an opening that runs through the entire thickness of the shim. Since the height h2 of the second slurry outlet 21 is less than the thickness h3 of the coating shim 400, the first slurry outlet 11 can be partially located above the second slurry outlet 21 in the thickness direction Z of the shim, thereby ensuring that the first slurry outlet 11 partially overlaps with the second slurry outlet 21 in the thickness direction Z of the shim.

In a specific embodiment, the thickness h3 of the coating shim 400 is preferably 0.2-5 mm, and the height h2 of the second slurry outlet 21 is preferably 5%-95% of the thickness h3, so as to ensure the strength of the coating shim 400, and ensure that the first slurry outlet 11 on the coating shim 400 can partially overlap with the second slurry outlet 21 in the thickness direction Z of the shim.

In a specific embodiment, the first slurry outlet 11 and the second slurry outlet 21 have an overlapping width w2 of 0.1-9 mm in the length direction X. The overlapping width w2 is set such that the first slurry flowing out of the first slurry outlet 11 is lap jointed to the second slurry flowing out of the second slurry outlet 21, to enable an edge of the first coating layer to cover an edge of the second coating layer.

The size of the overlapping width w2 can be adjusted by changing the width and the position of the second slurry outlet 21. In a specific embodiment, in the length direction X, the overlapping width w2 does not exceed 20% of the width of the second slurry outlet 21, so as to not only ensure that the edge of the first coating layer covers the edge of the second coating layer and but also ensure the width of the second coating layer.

Figure 6:
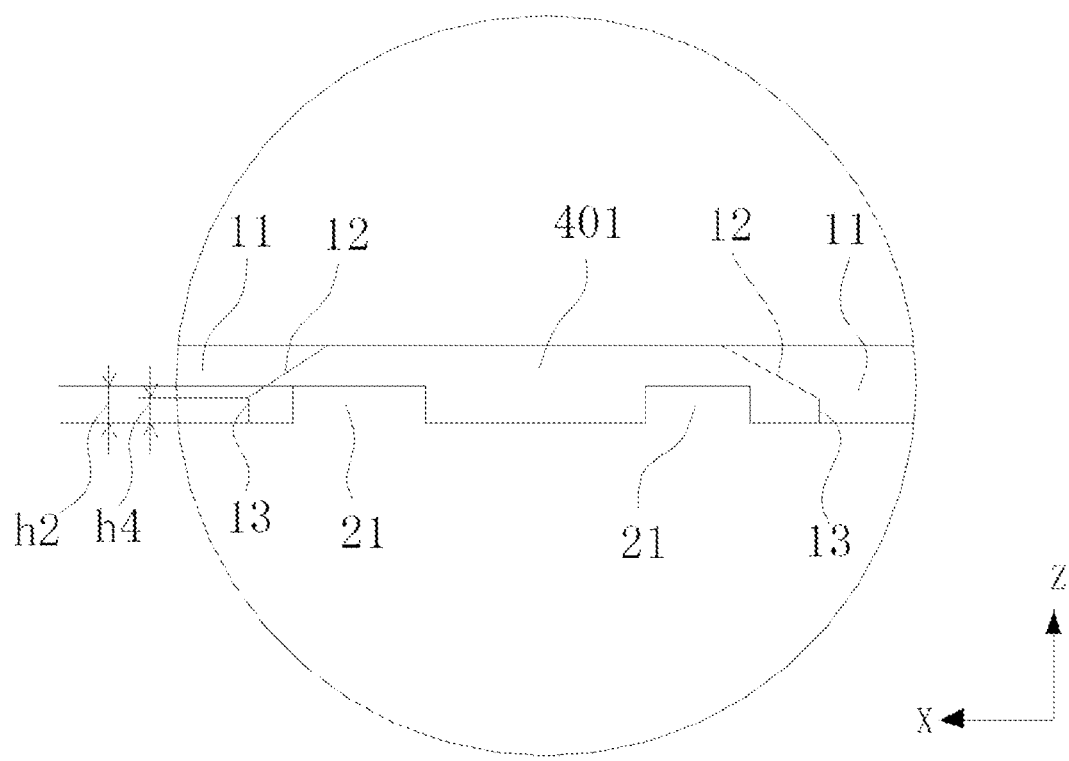
FIG. 6 is a partial enlarged front view of a coating shim according to another embodiment.

FIG. 6 is a partial enlarged front view of a coating shim 400 according to another embodiment.

As shown in FIG. 6, the first flow channel 1 has a side surface in the longitudinal direction X that includes a slope portion 12 and a step portion 13 connected to each other. Projections of the slope portion 12 and the second slurry outlet 21 partially overlap in the thickness direction Z of the shim. With the provision of the slope portion 12 and the step portion 13 connected to each other on the side surface of the first flow channel 1 in the length direction X, a side end of the slope portion 12 is connected to an end of the step portion 13 in the thickness Z direction of the shim, and the other side end thereof is inclined toward the second slurry outlet 21 in the length direction X, located above the second slurry outlet 21 in the thickness direction Z of the shim, and makes the first slurry flowing out of the first flow channel 1 through the slope portion 12 thinner in the thickness direction Z of the shim, so that the coating thickness where the first coating layer is lap jointed to the second coating layer will not be significantly increased to form a protrusion, and the overall thickness of the first coating layer thus remains uniform. The height of the step portion 13 and the angle of the slope portion 12 should be set to ensure that the projections of the slope portion 12 and the second slurry outlet 21 partially overlap in the thickness direction Z of the shim, so as to ensure that the first coating layer partially covers the second coating layer when the first slurry and the second slurry are being applied to the object 500 to be coated.

In some embodiments, the height h2 of the second slurry outlet 21 is preferably 5%-95% of the thickness h3, that is, h2=(5%-95%)×h3; and the height h4 of the step portion 13 is less than the height h2 of the second slurry outlet 21 in the thickness direction Z of the shim, that is, h4<h2.

In a specific embodiment, the thickness h3 of the coating shim 400 is preferably 0.2-5 mm, the height h4 of the step portion 13 in the thickness direction Z of the shim is 0.01-4.8 mm, and the height of the step portion 13 is set to not only ensure that the projections of the slope portion 12 and the second slurry outlet 21 partially overlap in the thickness direction Z of the shim, but also ensure the structural strength of the coating shim 400.

Figure 7:
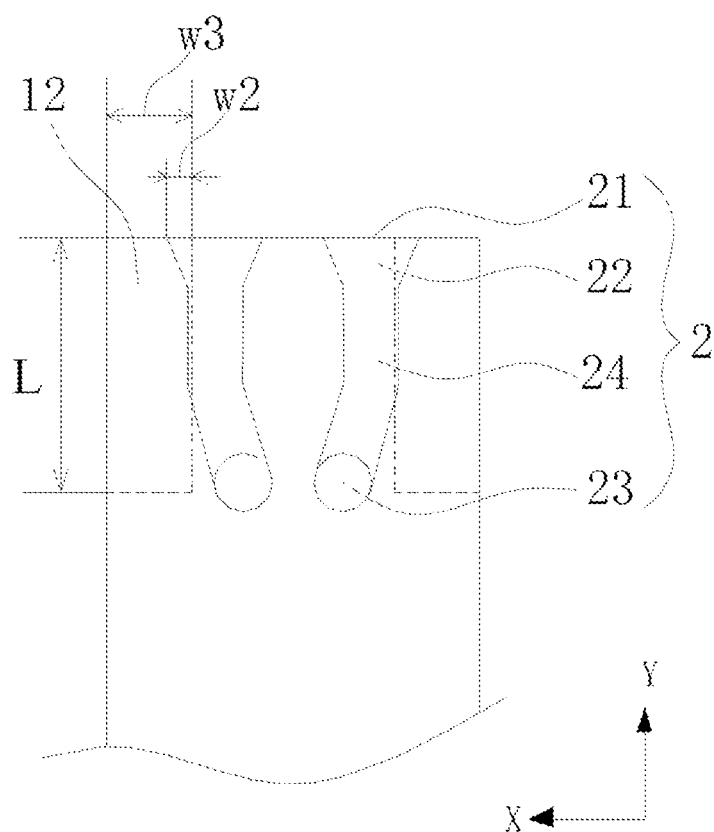
FIG. 7 is a partial schematic view of a specific embodiment in a direction A in FIG. 5.

FIG. 7 is a partial schematic view of a specific embodiment in a direction A in FIG. 5.

As shown in FIG. 7, in a specific embodiment, the slope portion 12 extends toward the outer side of the first flow channel 1 in the length direction X, so that the projections of the slope portion and the second slurry outlet 21 partially overlap in the thickness direction Z of the shim. In this embodiment, in the length direction X, the width of the first flow channel 1 at the position where the first slurry flows in is less than the width of the first slurry outlet 11. That is, the first flow channel 1 has an increased width at the position of the slope portion 12, so that after flowing to the slope portion 12, the first slurry flows out to the first slurry outlet 11 along the slope portion 12.

Figure 8:
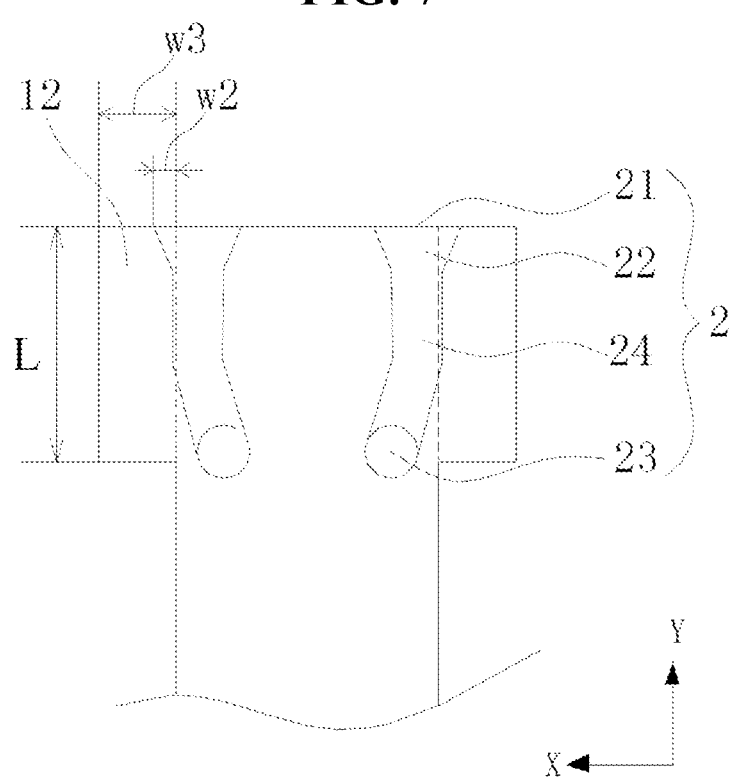
FIG. 8 is a partial schematic view of another specific embodiment in the direction A in FIG. 5.

FIG. 8 is a partial schematic view of another specific embodiment in the direction A in FIG. 5.

As shown in FIG. 8, in another specific embodiment, the slope portion 12 extends toward the inner side of the first flow channel 1 in the length direction X, so that the projections of the slope portion and the second slurry outlet 21 partially overlap in the thickness direction Z of the shim. In this embodiment, in the length direction X, the width of the first flow channel 1 at the position where the first slurry flows in is greater than the width of the first slurry outlet 11. That is, the first flow channel 1 has a decreased width at the position of the slope portion 12, so that after flowing to the slope portion 12, the first slurry flows out to the first slurry outlet 11 along the slope portion 12.

The extension direction of the slope portion 12 in the length direction X is set according to the positional relationship between the first flow channel 1 and the second flow channel 2 on the coating shim 400 and the widths of the first slurry outlet 11 and the second slurry outlet 21, so as to realize the coating of the first coating layer and the second coating layer with predetermined widths, and realize that the first coating layer partially covers the second coating layer.

In a specific embodiment, the width w3 of the slope portion 12 in the length direction X (the arrangement direction of the first flow channel 1 and the second flow channel 2) is not greater than 10 mm. The setting of the width of the slope portion 12 can not only ensure that the slope portion 12 fully covers the second slurry outlet 21, but can also ensure the width of the part of the second slurry outlet 21 that is not covered by the slope portion 12, thereby ensuring that the first coating layer partially covers the second coating layer, and ensuring the width of the exposed part of the second coating layer.

In some embodiments, in the width direction Y (the outflow direction of the first slurry), the slope portion 12 has a length L less than that of the first flow channel. In a specific embodiment, the length L of the slope portion 12 is 1-50 mm. The length of the slope portion 13 is set such that the slope portion 12 covers, in the width direction Y, the edge of the second flow channel 2 for a certain length, which can ensure that when flowing out, the first slurry covers the second slurry.

As shown in FIGS. 7 and 8, in some embodiments, the second flow channel 2 comprises an opening portion 22. The opening portion 22 extends to the second slurry outlet 21, and the opening portion 22 has a width in the length direction X (the arrangement direction of the first flow channel and the second flow channel) that gradually increases in a direction from a slurry inlet 23 of the second flow channel 2 to the second slurry outlet 21. With the provision of the opening portion 22 extending to the second slurry outlet 21, when the second slurry flows to the opening portion 22 along the second flow channel 2, the width of the flow channel increases, but the flow rate of the second slurry remains unchanged, so that the depth of the second slurry in the opening portion 22 in the thickness direction Z of the shim becomes smaller, thereby making the second coating layer applied from the second slurry outlet 21 to the object 500 to be coated thinner.

In some embodiments, as shown in FIGS. 5 to 8, the second flow channel 2 includes a groove portion 24 having a height in the thickness direction of the shim that is less than the thickness of the shim, the groove portion 24 communicates the slurry inlet 23 of the second flow channel 2 with the second slurry outlet 21, and the slurry inlet 23 penetrates the coating shim 400 in the thickness direction Z of the shim. The second slurry flows into the groove portion 24 from the slurry inlet 23, and flows to the second slurry outlet 21 through the opening portion 22, so as to apply the second coating layer to the object 500 to be coated. The slurry inlet 23 is configured to penetrate the coating shim 400, which can be applied to the situation where the second slurry flows into the coating shim 400 from the upper die 200 or the lower die 300 of the coating device 100, thereby increasing the application range of the coating shim 400.

Figure 9:
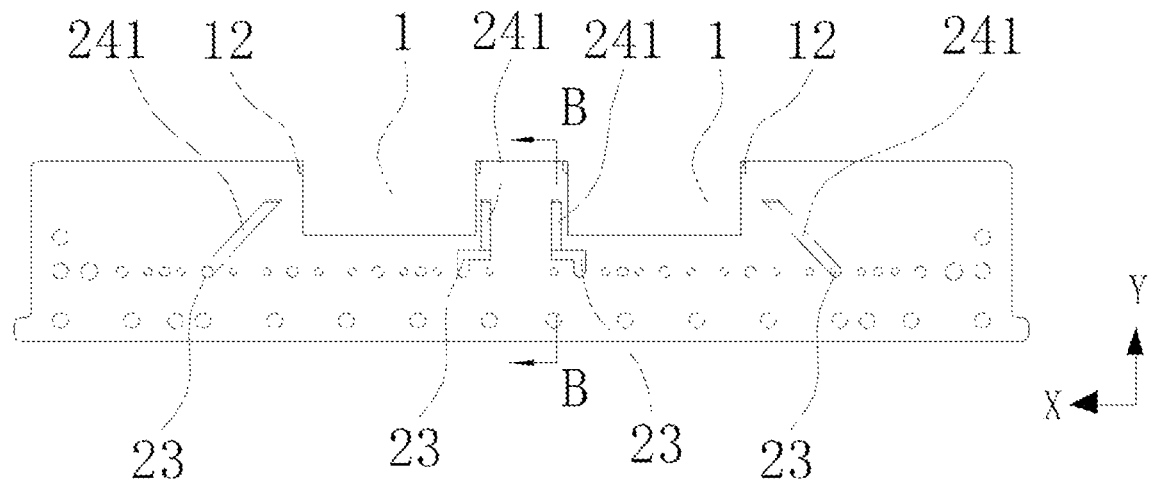
FIG. 9 is a bottom view of a coating shim according to an embodiment of the present application.
Figure 10:
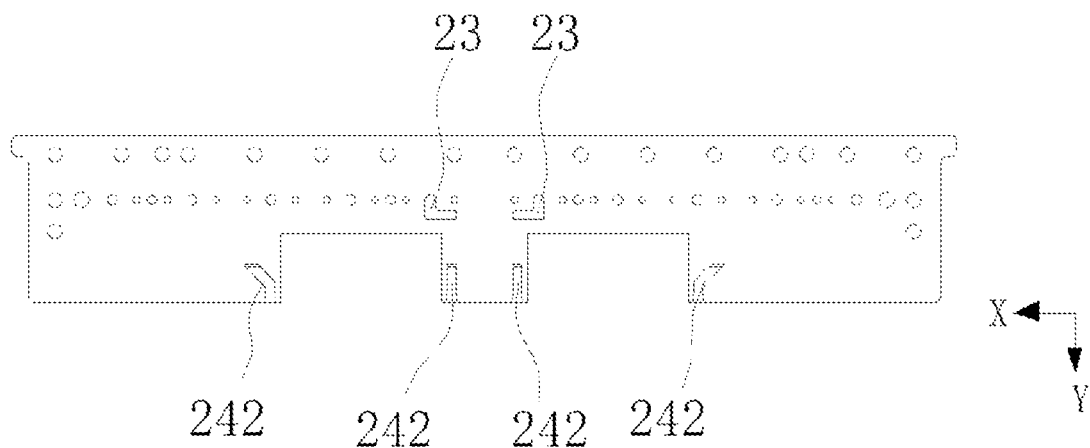
FIG. 10 is a top view of a coating shim according to an embodiment of the present application.

FIG. 9 is a bottom view of a coating shim 400 according to an embodiment of the present application; FIG. 10 is a top view of a coating shim 400 according to an embodiment of the present application; and FIG. 11 is a cross-sectional view along B-B in FIG. 9.

Figure 11:
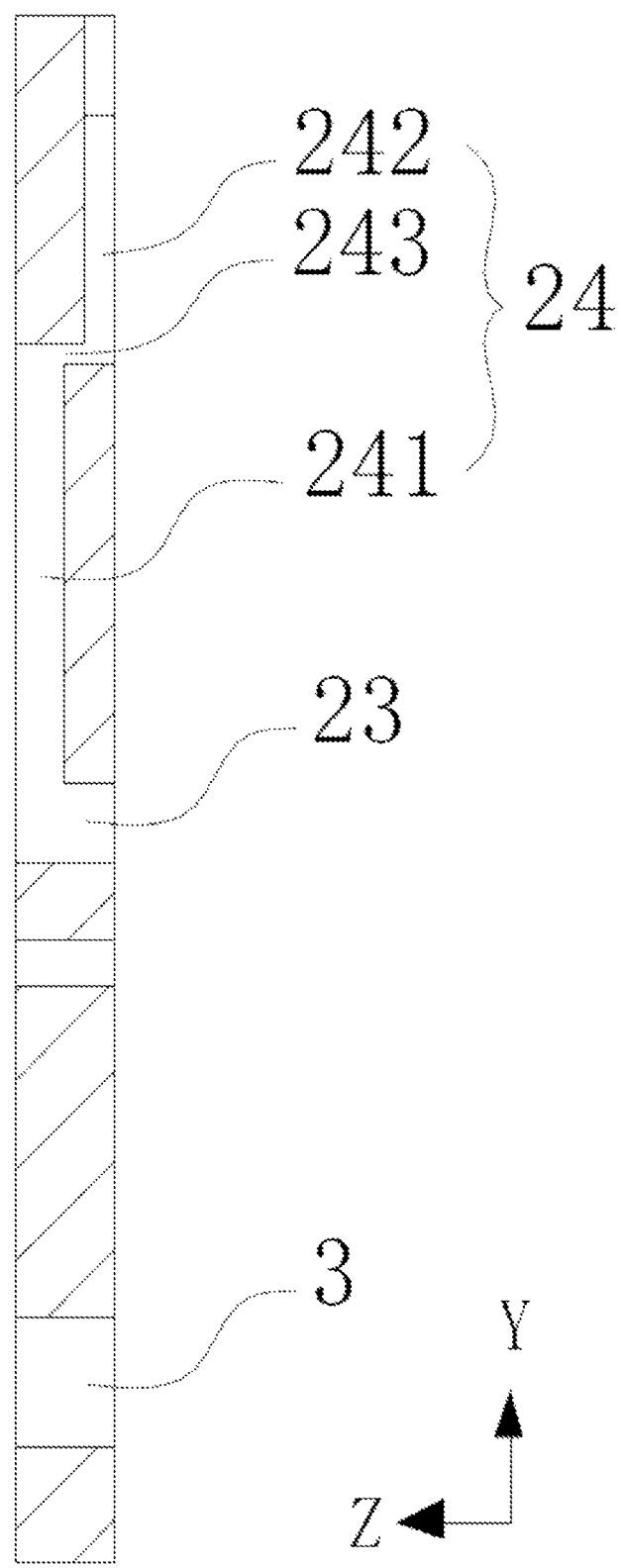
FIG. 11 is a cross-sectional view along B-B in FIG. 9.

In a specific embodiment, as shown in FIGS. 9 to 11, the groove portion 24 of the second flow channel 2 includes an inlet section 241, an outlet section 242 and a communication section 243; in the thickness direction Z of the shim, the inlet section 241 and the outlet section 242 are respectively located on two sides of the coating shim 400; and the inlet section 241 is connected to the slurry inlet 23, the communication section 243 is connected to the inlet section 241 and the outlet section 242, and the outlet section 242 is connected to the second slurry outlet 21.

As shown in FIG. 9, slurry inlets 23 penetrate the coating shim 400 in the thickness direction Z of the shim. The slurry inlets 23 of the second flow channel 2 that are located in the middle of the coating shim 400 are strip-shaped through holes in the shape of a right angle, and the slurry inlets 23 of the second flow channel 2 that are located at two side ends of the shim are circular through holes. In the present application, the position and the specific shape of the slurry inlet 23 are specifically set according to the position where the slurry flows out of the upper die 200 or the lower die 300 and the function of the slurry inlet 23 is to introduce the second slurry stored in the upper die 200 or the lower die 300 into the second flow channel 2 to realize the coating of the second coating layer. The specific shape of the slurry inlet 23 is not limited in the present application, as long as the second slurry can be introduced.

The inlet section 241 of the groove portion 24 is located on the same side of the shim as the slope portion 12 of the first flow channel 1 in the thickness direction Z of the shim. In the width direction Y, the inlet section 241 and the slope 12 keep a distance to prevent the second flow channel 2 from interfering with the first flow channel 1 to mix the first slurry and the second slurry. In the length direction X, the inlet sections 241 of the second flow channel 2 that are located in the middle of the shim are elongated groove bodies extending in the width direction Y, while the inlet sections 241 of the second flow channel 2 that are located at the two side ends of the shim are inclined elongated groove bodies at an angle with respect to the width direction Y. In the present application, the position and the specific shape of the inlet section 241 are determined according to the specific position of the slurry inlet 23. The function of the inlet section 241 is to introduce the second slurry flowing in from the slurry inlet 23 into the communication section 243 and into the outlet section 242 through the communication section 243. The specific shape of the inlet section 241 is not limited in the present application.

The outlet section 242 of the groove portion 24 is located on the side of the coating shim 400 opposite to the inlet section 241 in the thickness direction Z of the shim. One end of the outlet section 242 is connected to the communication section 243, and the other end thereof is connected to the second slurry outlet 21. In the length direction X, the outlet sections 242 of the second flow channel 2 that are located in the middle of the shim are strip-shaped groove bodies extending in the width direction Y, while the outlet sections 242 of the second flow channel 2 that are located at the two side ends of the shim are bent groove bodies. In the present application, the function of the outlet section 242 is to lead out the second slurry flowing out of the inlet section 241 to the second slurry outlet 21, so as to coat the object 500 to be coated. The position and the specific shape of the outlet section 242 are determined according to the positions and the shapes of the slurry inlet 23 and the inlet section 241, and it is necessary to make the projections of the first slurry outlet 11 and the second slurry outlet 21 partially overlap in the thickness direction Z of the shim.

The shape of the flow channel of the second flow channel 2 is adaptively set according to the outlet of the upper die 200 or the lower die 300 of the coating device 100 for the second slurry. For a structure in which the distance between the slurry inlet 23 and the second slurry outlet 21 is relatively large, the inlet section 241 and the outlet section 242 of the second flow channel 2 are respectively arranged on two sides of the shim in the thickness direction Z of the shim, so that the slurry flows out more smoothly and the application range of the coating shim 400 is increased.

In a specific embodiment, the shim has a thickness of 0.2-5 mm; and in the thickness direction Z of the shim, the inlet section 241 and the outlet section 242 each have a depth of 5%-95% of the thickness of the shim. The setting of the depth of the inlet section 241 and the outlet section 242 can make the second slurry flow out along the second flow channel 2, ensure the strength of the coating shim 400, and ensure that the first slurry outlet 11 and the second slurry outlet 21 of the coating shim 400 partially overlap in the thickness direction Z of the shim.

The present application also provides a coating device 100 using the coating shim 400 described above. The coating device 100 includes an upper die 200 and a lower die 300, and the coating shim 400 is arranged between the upper die 200 and the lower die 300.

The coating shim 400 of the present application is provided with a plurality of first flow channels 1 arranged side-by-side, second flow channels 2 are provided on two sides of each first flow channel 1, and the first slurry outlet 11 of the first flow channel 1 and the second slurry outlet 21 of the second flow channel 2 partially overlap in the thickness direction Z of the shim, so that the first coating layer and the second coating layer partially overlap in the thickness direction Z of the shim. The first coating layer partially covers the second coating layer. During the drying process, the second slurry is prevented from penetrating towards the first slurry to the upper surface of the first coating layer, thereby preventing the problem of the unclear boundary between the first coating layer and the second coating layer at the adjacent position. When the object 500 to be coated is an electrode sheet of the battery, the first slurry is an active material, which is applied to the electrode sheet of the battery to form an active material layer; and the second slurry is an insulating material, which is applied to the electrode sheet of the battery to form an insulating layer. The active material layer covers the edge of the insulating layer to prevent the insulating layer from penetrating to the surface of the active material layer so that a clear boundary is formed. During die-cutting of a tab for the electrode sheet of the battery, the die-cutting position of the tab is determined according to the clear boundary formed between the active material layer and the insulating layer, improving the dimensional accuracy of the electrode sheet.

What are described above are only preferred embodiments of the present application and are not intended to limit the present application. For those skilled in the art, the present application may have various modifications and changes. Any modifications, equivalent substitutions, improvements, etc. made within the spirit and principles of the present application shall fall into the scope of protection of the present application.

The invention claimed is:

1. A coating shim for applying a first slurry and a second slurry to an object to be coated, the coating shim comprising:
   a first flow channel for applying the first slurry to the object to be coated to form a first coating layer; and
   a second flow channel for applying the second slurry to the object to be coated to form a second coating layer,
   wherein the first flow channel has:
      a side surface in the arrangement direction of the first flow channel and the second flow channel; and
      a first slurry outlet at a first end face of the coating shim facing the object to be coated,
   wherein the second flow channel has a second slurry outlet at the first end face,
   wherein the first slurry outlet is arranged spaced apart from the second slurry outlet by a distance (w1) in a length direction of the coating shim, the side surface of the first flow channel includes a sloped portion, and the sloped portion and the second slurry outlet are configured to partially overlap in a thickness direction of the coating shim, such that the first coating layer and the second coating layer partially overlap in the thickness direction of the coating shim.

2. The coating shim according to claim 1, wherein the height of the second slurry outlet in the thickness direction of the shim is less than the thickness of the coating shim.

3. The coating shim according to claim 1, wherein the first slurry outlet and the second slurry outlet have an overlapping width of 0.1-9 mm in an arrangement direction of the first flow channel and the second flow channel.

4. The coating shim according to claim 1, wherein the second flow channel comprises an opening portion extending to the second slurry outlet, the opening portion having a width in an arrangement direction of the first flow channel and the second flow channel that increases in a direction from a slurry inlet of the second flow channel to the second slurry outlet.

5. The coating shim according to claim 1, wherein the side surface of the first flow channel further comprises a step portion connected to the sloped portion.

6. The coating shim according to claim 5, wherein the step portion has a height of 0.01-4.8 mm in the thickness direction of the coating shim.

7. The coating shim according to claim 5, wherein the slope portion has a width in an arrangement direction of the first flow channel and the second flow channel, and the width is not greater than 10 mm.

8. The coating shim according to claim 5, wherein the slope portion has a length of 1-50 mm in an outflow direction of the first slurry.

9. The coating shim according to claim 1, wherein the second flow channel comprises a groove portion and a slurry inlet, the groove portion is interconnecting the slurry inlet of the second flow channel and the second slurry outlet, and the slurry inlet penetrates the coating shim in the thickness direction of the coating shim.

10. The coating shim according to claim 9, wherein the groove portion comprises an inlet section, an outlet section and a communication section; in the thickness direction of the shim, the inlet section and the outlet section are respectively located on two sides of the coating shim; and the inlet section is connected to the slurry inlet, the communication section is connected to the inlet section and the outlet section, and the outlet section is connected to the second slurry outlet.

11. The coating shim according to claim 10, wherein the coating shim has a thickness of 0.2-5 mm, and the inlet section and the outlet section each have a depth of 5%-95% of the thickness of the coating shim.

12. A coating device, comprising:
a lower die,
an upper die, and
the coating shim of claim 1, which is arranged between the upper die and the lower die.

13. A coating shim for applying a first slurry and a second slurry to an object to be coated, the coating shim comprising:
a first flow channel for applying the first slurry to the object to be coated to form a first coating layer; and
a second flow channel for applying the second slurry to the object to be coated to form a second coating layer,
wherein the first flow channel comprises:
a side surface in the arrangement direction of the first flow channel and the second flow channel, the side surface of the first flow channel comprising a sloped portion and a step portion connected to the sloped portion; and
a first slurry outlet at a first end face of the shim facing the object to be coated, wherein the second flow channel comprises a second slurry outlet at the first end face,
wherein the sloped portion and the second slurry outlet are configured to partially overlap in a thickness direction of the coating shim, such that the first coating layer and the second coating layer partially overlap in the thickness direction of the coating shim.

14. The coating shim according to claim 13, wherein the first slurry outlet is arranged apart from the second slurry outlet by a distance (h1) in the thickness direction of the coating shim.

15. The coating shim according to claim 13, wherein the coating shim has a thickness (h3), and the first slurry outlet has a height equal to the thickness (h3) in the thickness direction of the coating shim.

16. The coating shim according to claim 15, wherein the second slurry outlet has a height (h2) in the thickness direction of the coating shim, and the height (h2) is 5%-95% of the thickness (h3).

17. The coating shim according to claim 16, wherein the step portion has a height (h4) in the thickness direction of the shim, the height (h4) is less than the height (h2).

18. The coating shim according to claim 13, wherein the first slurry outlet and the second slurry outlet have an overlapping width (w2) of 0.1-9 mm in a length direction of the coating shim.

19. The coating shim according to claim 13, wherein the first slurry outlet and the second slurry outlet have an overlapping width (w2) not exceeding a width of the second slurry outlet in the length direction of the coating shim.

20. The coating shim according to claim 13, wherein the sloped portion has a width (w3) in the length direction of the coating shim, and the width (w3) is not greater than 10 mm.

* * * * *